Sept. 8, 1970    T. J. HARRIS    3,527,520
LASER ROTARY SCANNER
Filed Dec. 29, 1965
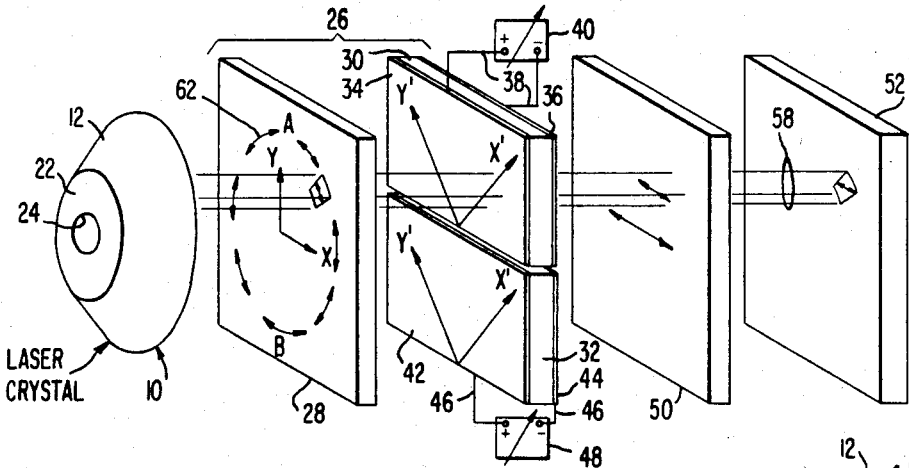
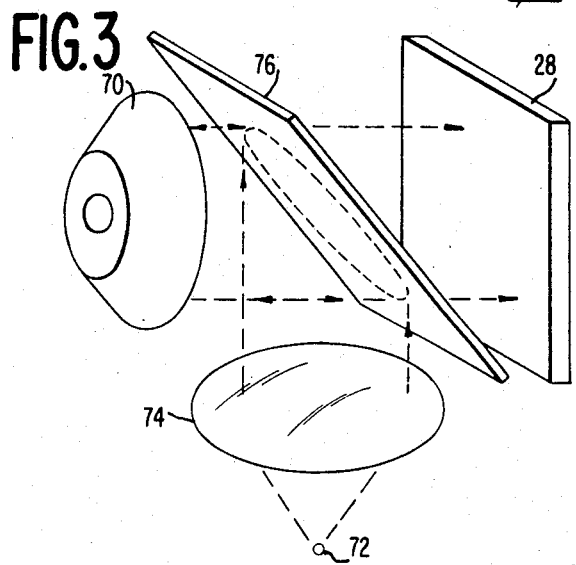
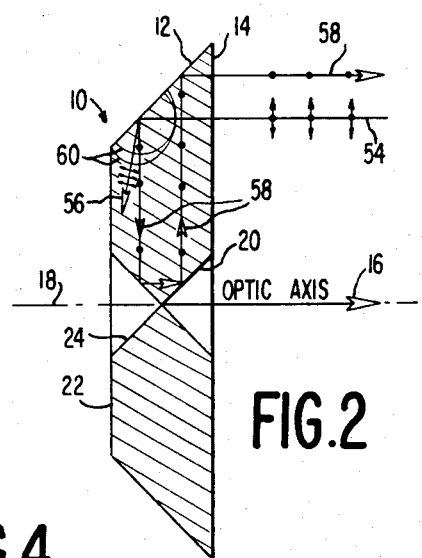
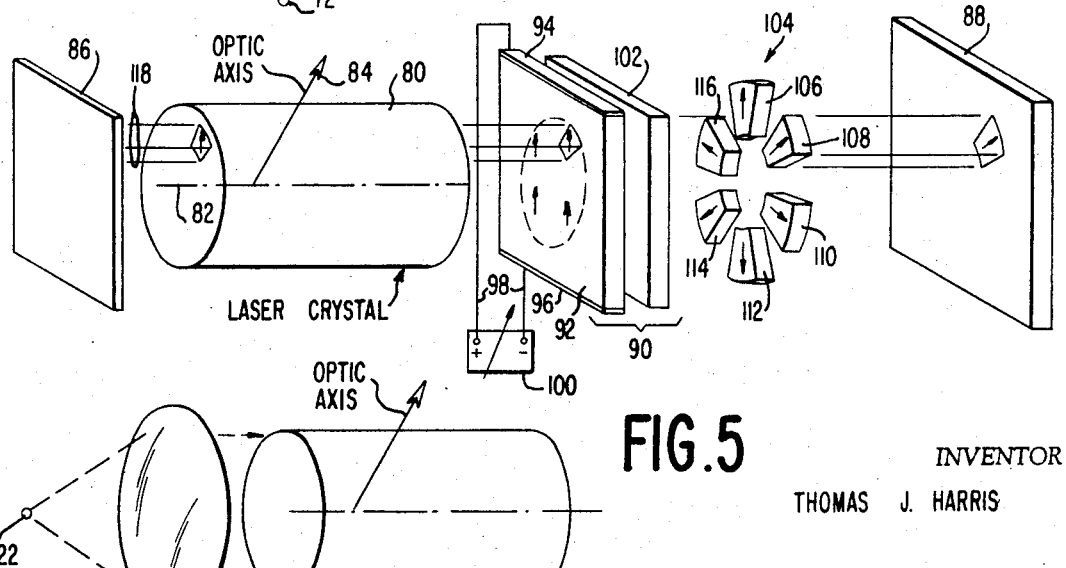
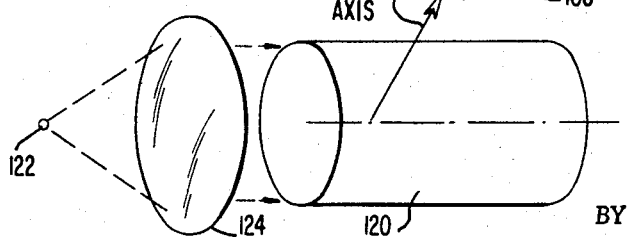
INVENTOR
THOMAS J. HARRIS
BY Sughrue, Rothwell, Mion, Zinn & Macpeak
ATTORNEYS

United States Patent Office 3,527,520
Patented Sept. 8, 1970

3,527,520
LASER ROTARY SCANNER
Thomas J. Harris, Poughkeepsie, N.Y., assignor to International Business Machines Corporation, Armonk, N.Y., a corporation of New York
Filed Dec. 29, 1965, Ser. No. 517,354
Int. Cl. G02f *1/26;* H01s *3/00*
U.S. Cl. 350—150                                      10 Claims

ABSTRACT OF THE DISCLOSURE

A rotary light scanner including a light source for transmitting along a path the linearly polarized rays of a light beam produced by the source, optic rotator means in the path for selectively rotating the direction of polarization of each of the rays through a plurality of angles, and analyzer means for passing without loss only rays having a predetermined direction of polarization after rotation. The light source may be a uniaxial laser crystal or a source of collimated light and a birefringement crystal. The crystals may be in the shape of a truncated right circular cone having an optic axis parallel to its geometric axis or a cylindrical rod having an optic axis transverse to its longitudinal centerline.

---

This invention relates generally to an improved rotary light scanner and, more particularly, to a laser device which scans in a circular pattern.

The primary object of the invention is to electro-optically control the lasing action of a birefringement crystal in a cavity to provide a circular light scanning pattern.

Another important object of the invention is to provide a narrow band light rotary scanner utilizing the linear polarizing action of a birefringent crystal in combination with a controllable linear polarization direction rotator and an analyzer to provide a circular light scanning pattern.

Another broad object of the invention is to provide a laser rotary scanner wherein a circular laser scan is obtained by preventing lasing at all but one point at a time around the periphery of a disc-shaped birefringent laser crystal by means of an adjustable electro-optic polarization direction rotator and an analyzer.

A more specific object of the invention is to provide a rotary light scanner including a disc-shaped birefringent crystal having internal reflecting surfaces which converts an incident narrow band unpolarized light beam to a reflected linearly polarized light beam emanating from the circular periphery of the crystal at different linear polarization directions, and means for selectively passing different polarization directions to produce a circular scan with the reflected beam.

Another specific object of the invention is to provide a rotary light scanner employing a birefringent crystal in the shape of a cylindrical rod for linearly polarizing a narrow band light beam in combination with a controllable linear polarization direction rotator and a multi-directional analyzer to produce a light beam scanning in a circular pattern.

Briefly, the foregoing objects are accomplished in a preferred embodiment of the invention by providing a laser rotary light scanner including a birefringent laser crystal which will lase when properly activated. The crystal has a circular face in a plane perpendicular to the path of the collimated monochromatic light beam emitted by the laser crystal. The crystal has internal reflecting surfaces and an optic axis parallel to the path of the scanning light beam. Light reflected from the internal surfaces of the crystal is in the form of a hollow circular beam of linearly polarized ordinary rays coaxial with the optic axis. Furthermore, the linear polarization direction of the light in the reflected beam is different at different points around the periphery of the crystal.

The reflected light is directed through an electro-optic rotator which is capable of rotating the direction of linear polarization of the light beam in accordance with a variable electric field applied to the rotator. The output of the rotator is directed through an analyzer which passes without loss only light polarized in a predetermined direction and introduces losses to all other polarization directions.

The light passed by the analyzer is reflected back through the crystal by a suitably placed mirror which defines the laser cavity. However, for a given rotation by the rotator, the crystal will lase only at one filament corresponding to the polarization direction passed without loss by the analyzer. Losses introduced by the analyzer to other polarization directions is sufficient to prevent lasing thereof. A circular laser scan is obtained by applying a continuously varying electric field to the rotator so that successive points around the periphery of the crystal will lase.

If the laser birefringent crystal is replaced by a non-lasing birefringent crystal, an external source of collimated narrow band light may be used to provide a light beam scanning in a circular pattern. The two mirrors are not required, and a suitable imaging device is placed at the output of the analyzer to image the circular scan.

In another preferred embodiment of the invention, there is provided a birefringent uniaxial laser crystal in the form of a cylindrical rod having an optical axis transverse to the longitudinal geometrical axis of the rod. Collimated monochromatic light emitted by the crystal is reflected back and forth through the crystal which is long enough so that only the ordinary rays emanate from the ends of the rod. These rays are linearly polarized in a predetermined direction and are applied to an electro-optic rotator which rotates the direction of linear polarization in accordance with the electric field applied thereto. The output of the rotator is directed through a circular analyzer having analyzer segments disposed about the periphery thereof. Each analyzer portion passes without loss a different direction of linear polarization of light while introducing losses to all other directions of polarization. As in the first preferred embodiment, only the filament on the crystal corresponding to the polarization direction passed without loss will lase. When the electric field is continuously varied, the direction of polarization of the light beam will be continuously rotated to pass without loss through successive segments of the analyzer, thereby resulting in a circular scan of the laser beam. Furthermore, the laser crystal may be replaced by an identical non-lasing crystal in which case the light is derived from a source of narrow band collimated light to provide a circularly scanning light beam.

The foregoing and other objects, features and advantages of the invention will be apparent from the following more particular description of preferred embodiments of the invention, as illustrated in the accompanying drawing.

In the drawing:

FIG. 1 is a schematic diagram of a preferred embodiment of the invention incorporating a birefringent laser crystal having internal reflecting surfaces to produce a laser beam scanning in a circular pattern;

FIG. 2 is a cross-sectional view of the crystal in FIG. 1 showing the optical characteristics of the crystal which provides the rotary or circular scan;

FIG. 3 is a schematic fragmentary view showing the scanner of FIG. 1 as modified to employ a non-lasing crystal;

FIG. 4 is a schematic view of a second embodiment of the invention incorporating a cylindrical birefringent laser crystal for producing the beam to rotary scanning pattern; and FIG. 5 is a schematic fragmentary view of the scanner of FIG. 4 as modified to use a non-lasing cylindrical crystal.

The preferred embodiment of the invention will be described in conjunction with FIGS. 1 and 2. There is provided a laser crystal 10 which will lase when properly activated to produce monochromatic collimated light. A suitable source of power (not shown) may be provided to activate the crystal 10. For example, a flash tube can be wrapped around the crystal and operated in a well-known manner. Crystal 10 is also a uniaxial birefringent crystal. It is cut in the shape of a truncated right circular cone having an outer surface 12 which forms an angle at 45° with the face 14 which forms the larger diameter base of the cone. Furthermore, the crystal is cut so that its optic axis 16 is parallel to the geometric axis 18 of the truncated cone. A right circular conical hole 20 is cut in the face 14 of crystal 10 coaxial with the geometric axis 18 so that the apex of the cone occurs at a point half way between face 14 and the other face 22 of crystal 10. Another right circular conical hole 24 is cut in face 22 coaxial with axis 18 and with its apex abutting the apex of the cone 20.

Adjacent crystal 10 is an electro-optic rotor 26 which functions to rotate the direction of linear polarization of an incident light beam through an angle determined by the strength of an electric field applied to the rotator. Rotator 26 comprises a quarter wave plate 28 and two vertically spaced electro-optic crystals 30 and 32. Plate 28 imparts a 90° phase shift to elliptically polarize linearly polarized light not polarized in the plane of either the $x$ or $y$ axes of the plate. Electro-optic crystals 30 and 32 imparts a phase shift determined by the strength and polarity of an electric field applied thereto to return the light to linearly polarized light having a polarization direction corresponding to the applied electric field.

A variable electric field is applied across crystal 30 by means of a pair of transparent electrodes 34 and 36 on opposite faces of the crystal and connected by a pair of leads 38 to a source 40 of variable DC voltage. In like manner, a pair of transparent electrodes 42 and 44 are mounted on opposite faces of crystal portion 32 and are connected via a pair of leads 46 to a source 48 of variable DC voltage.

The arrows $x$ and $y$ drawn on quarter wave plate 28 indicate the orientation of the $x$ and $y$ axes of the plate, and the arrows $x'$, $y'$ drawn on electro-optic crystals 30 and 32 indicate the orientation of the $x$ and $y$ axes of these crystals when an electric field has been applied thereto. When the electric field is zero, the $x$ and $y$ axes of crystals 30 and 32 coincide with the $x$ and $y$ axes of the quarter wave plate 28. When no voltage is applied to crystals 30 and 32, light passes therethrough with negligible phase shift. When light is incident upon plate 28, linearly polarized in the plane of either its $x$ or $y$ axis, no phase shift occurs.

Adjacent the electro-optic rotor 26 is an analyzer 50 optically oriented to pass without loss only light linearly polarized in the horizontal direction. Adjacent analyzer 50 is a partially transmissive laser output mirror 52. In operation, laser light beam 54 is incident upon the crystal 10 along the optic axis 16 and is reflected at an angle of 90° from the surface 12 along a path normal to the optic axis. Due to the nature of a birefringent crystal, the reflected beam is split into an extraordinary ray 56 and an ordinary ray 58. The extraordinary ray does not follow Snell's law and after reflection travels through the crystal at an angle other than 90° with respect to the incident light beam 54. The wave surfaces generated by light beam at the reflecting boundary expand at a rate corresponding to the extraordinary ray velocity. Consequently, the extraordinary ray will be reflected at an angle greater than 90° with respect to the incident ray in a negative uniaxial crystal and at an angle less than 90° in a positive uniaxial crystal. The wave surfaces are designated by the reference numeral 60.

As shown, the extraordinary ray is composed of light linearly polarized parallel to the plane of the paper. All polarization directions in the incident light beam 54 propagate along the optic axis 16 at the same velocity prior to reflection. However, after reflection, light lineary polarized in the plane perpendicular to the plane of the paper follows the path of the ordinary ray 58 which is reflected from the surface on the conical hole 24 horizontally to the right parallel to optic axis 16 and then reflected from the surface of conical hole 20 vertically upward perpendicular to the optic axis. The ordinary ray is then reflected from surface 12 parallel to the optic axis and parallel to the incident light beam 54. Thus only light polarized perpendicular to the optic axis is reflected back to mirror 52, and retained in the laser cavity to contribute to laser action. Incident light beam 54 is representative of only a single typical light beam, and it is to be understood that the laser light beam is incident on crystal 10 around the entire face 14 of the crystal. All light beams incident on the outer periphery of face 14 within an area such that they strike and are reflected from surface 12 of the crystal will form a circular reflected light beam of linearly polarized ordinary rays polarized in the plane perpendicular to plane of the paper.

Because of the reflection from the surfaces of the conical holes 20 and 24 and the polarizing action of crystal 10, each point on any 180° arc of this circular beam will consist of light linearly polarized in a different direction. The arrow drawn in a circle 62 on the face of quarter wave plate 32 schematically represent the manner in which the polarization direction of the beam reflected from crystal 10 varies with respect to the positions around the face 14 of the crystal.

Since the polarization directions at diametrically opposite points of the 360° arc of the reflected circular beam are identical, the two spaced electro-optic crystals 30 and 32, rather than a single crystal, are used so that they may be independently controlled. Referring to FIG. 1, let us now consider the typical light beam 58 whose polarization direction will be assumed to be 45°. Voltage source 40 is adjusted to apply to the crystal 30 an electric field sufficient to cause the rotator 26 to rotate the linear polarization of beam 58 through 45° counterclockwise so that it is now horizontally polarized. Analyzer 50 then passes only beam 58 without loss since all the other beams' polarization directions were also rotated through a 45° angle so that, after passing through rotator 26, they are linearly polarized in other than a horizontal direction thereby experiencing varying degrees of loss as they pass through analyzer 50. Electro-optic crystal 32 may be similarly subjected to an electric field from source 48 to control the positioning of the beams passing through the lower half of the quarter wave plate 28. The beam 58 is reflected by mirror 52 through analyzer 50 and rotator 26, where it is returned to its original polarization direction, and back through laser crystal 10, thereby causing crystal 10 to lase at the filament corresponding to beam 58. Consequently, a laser beam output will be obtained from output mirror 52 at a point where beam 58 strikes the mirror. The loss experienced by beams from other points on crystal 10 prevents them from lasing.

It can be seen that a circular scan can be made to appear on mirror 52 by suitably controlling the variable voltage sources 40 and 48 so that the successive polarization directions around the circle 62 are rotated to a horizontal polarization direction to pass through analyzer 50 and thereby form a circular laser output pattern on mirror 52. It is also contemplated the crystals 30 and 32 be replaced by a single crystal having single electrodes on either face thereof connected to a single variable DC voltage source to provide the rotary scan. In this case, however, there will always be two positions on circle 62 which would be rotated to the horizontal direction to pass through analyzer 50. In the embodiment illustrated in FIG. 1, a plus or minus voltage applied to either of the crystals 30 or 32 can be controlled so that the output beam from analyzer 50 is rotated continuously clockwise or counterclockwise by the amount dependent upon the applied voltage, thereby providing a laser rotary scanner. Therefore, the crystal will lase in successive segments around its periphery and the width of each segment will depend upon the pumping level of the laser. If the crystal is operating near threshold, the width of these segments can be made as small as 5°. With zero voltage on the rotator 26, the laser crystal 10 will lase in positions A and B as illustrated in Fig. 1 on the circle 62 on plate 28. Furthermore, either positive or negative uniaxial crystals may be used.

FIG. 3 illustrates a modified embodiment in which the inventive concept illustrated in FIGS. 1 and 2 may be applied to provide a narrow band light rotary scanner not employing laser action. In this modified embodiment, the laser birefringent crystal 10 is replaced by a conventional birefringent uniaxial crystal 70 having the same shape and internal structure as laser crystal 10. However, since laser light is not available, an external light source 72 of narrow band light is used. The light is passed through a collimating lens 74 and reflected from a beam splitter 76 to crystal 70 along the optic axis thereof. The linearly polarized ordinary rays are reflected from the internal surfaces of crystal 70 as a circular light beam which passes through beam splitter 76 to the quarter wave plate 28 of the electro-optic rotator 26. In this case the mirror 52 may be replaced by a suitable imaging device, and the rotator 26 is controlled to provide a circularly scanning light beam output from analyzer 50. The operation of the narrow band light rotary scanner is the same as the operation of the laser rotary scanner illustrated in FIG. 1 and already described.

A modified embodiment of the laser rotary scanner is illustrated in FIG. 4. Here, use is also made of the interaction of the linear polarizing action of a briefringent crystal, the controllable rotation of the polarization direction provided by an electro-optic crystal, and the polarization direction-sensitive transmissibility of light as provided by an analyzer.

There is provided a laser birefringent crystal in the form of a right circular cylindrical rod 80. Not shown for purposes of clarity, a suitable source of power including, for example, a flash tube may be provided to activate the crystal 80. The useful laser light path within laser rod 80 is along the longitudinal center line 82 of crystal 80, and the optic axis 84 of crystal 80 is assumed to be at an angle of 60° with respect to the center line 82. A laser cavity is defined by a totally reflecting mirror 86 and a partially transmissive output mirror 88. Adjacent the right end of laser rod 80 is an electro-optic rotator 90 comprising an electro-optic crystal 92 having electrodes 94 and 96 on its upper and lower edges, respectively, connected via a pair of corresponding leads 98 to a variable source 100 of DC voltage. The rotator 90 also comprises quarter wave plate 102.

Adjacent rotator 90 is a segmented analyzer 104 comprising a plurality of segments schematically indicated as 106, 108, 110, 112, 114 and 116. Each segment passes with minimum loss only light linearly polarized in the direction indicated by the arrow drawn on each segment In operation, light emited by laser rod 80 along paths parallel to center line 82 is reflected from mirror 86. A particular light beam 118 will be considered. Light beam 118 is reflected from mirror 86 through crystal 80 and is linearly polarized by the double refraction or birefringence of the crystal. That is, the extraordinary ray composed of light linearly polarized in the horizontal direction is refracted away from the center line of the crystal whereas the ordinary ray composed of light linearly polarized in the vertical direction passes without deflection along a path parallel to the center line 82 of the crystal. The crystal is long enough so that the extraordinary ray is refracted out of the crystal before it reaches the end of the crystal adajcent rotator 90.

In this embodiment, therefore, all the light emanating from crystal 80 is linearly polarized in the vertical direction. Consequently, when a voltage is applied to electro-optic rotator 90 by means of variable DC source 100, all the polarization directions will be rotated through the same angle. However, analyzer 104 comprises the several segments 106–118, each of which will pass with minimum or no loss only light linearly polarized in the direction indicated by the arrow drawn on each segment. Each pair of diametrically opposite segments will pass light polarized in the same direction. Consequently, for a given voltage applied to the rotator 90, only one pair of segments of analyzer 104 will pass light with minimum loss. For example, for the selected light beam 118, a voltage sufficient to rotate the linearly polarized light 45° clockwise is applied to rotator 90 and light consequently will pass only through analyzer segments 108 and 114. This light will be reflected back through the analyzer, rotated to the original polarization direction by the rotator 90 and reflected back through the laser crystal 80 to cause lasing in the filaments around the periphery of rod 80 which corresponds in position to analyzer segments 108 and 114. Because of the losses introduced by the analyzer to other polarization directions, lasing will not occur in other points of the crystal. However, by continuously varying the voltage applied to rotator 90, the rotation imparted by rotator 90 will continuously vary with the aplied voltage to cause a circular scan of the laser beam as seen at output mirror 88.

The same inventive concept may be applied to a narrow band light rotary scanner by replacing the laser crystal 80 with a conventional birefringent uniaxial crystal 120 of the same rod shape and replacing mirror 86 with a source 122 of narrow band light which is collimated by a lens 124 and directed through rod 120, as illustrated in FIG. 5. The vertically polarized light transmited by rod 120 is rotated by rotator 90 and analyzed to provide a rotary or circular scan as described above with respect to FIG. 4.

The crystal 92 of the rotator 90 may also be divided into two verticaly spaced crystals with electrodes on the upper and lower edges of each crystal. Separate variable DC voltage sources connected to each crystal will then provide independent control of the upper and lower portions and eliminate the redundancy caused by the fact that there are two identical polarization directions in each 360° around the periphery of the reflected beam.

The electro-optic crystals 30 and 32 in FIG. 1 operate in the longitudinal mode, and the crystal 92 in FIG 4 operates in the transverse mode. Either mode may be used with appropirate crystal size and applied electric field. Narrow band light is used in FIGS. 1 and 5 so that dispersion caused by the elements of the scanners is negligible.

While the invention has been particularly shown and described with reference to preferred embodiments thereof, it will be understood by those skilled in the art that various changs in form and details may be made therein without departing from the spirit and scope of the invention.

What is claimed is:
1. A rotary light scanner comprising
   (a) a source of light including a birefringent crystal for transmitting along a path the linearly polarized ordinary rays of a light beam incident on said crystal, said linearly polarized ordinary rays forming a light beam having a circular cross-section.

(b) optic rotator means in said path for selectively rotating the direction of polarization of each of said ordinary rays transmitted by said birefringent crystal through a plurality of angles, and (c) analyzer means in said path adjacent said optic rotator means for passing without loss only those rays at the periphery of said circular cross-section beam having a predetermined direction of polarization after rotation by said optic rotator means.

2. A rotary light scanner as defined in claim 1
(a) wherein said optical rotator means comprises an electro-optical means and a quarter-wave plate, said angle of rotation of the polarization direction being dependent upon the strength of an electric field applied to said electro-optical means, and
(b) further comprising means for applying a variable electric field to said electro-optical means so that the rays passing without loss through said analyzer means form a circular pattern.

3. A rotary light scanner comprising
(a) a source of light including a birefringent crystal for transmitting along a path parallel to the optic axis of said crystal the linearly polarized ordinary rays of a light beam incident on said crystal, said crystal having internal reflecting surfaces reflecting linearly polarized ordinary rays which are transmitted along said path in the form of a beam having a circular cross-section with the linear polarization of the reflected beam being different at different points around the circular periphery thereof,
(b) optic rotator means in said path for selectively rotating the direction of polarization of each of said ordinary rays transmitted by said birefringent crystal through a plurality of angles, and
(c) analyzer means disposed in said path adjacent said optic rotator means for passing without loss only those rays at the periphery of said circular cross-section beam having a predetermined direction of polarization after rotation by said optic rotator means.

4. A rotary light scanner as defined in claim 3 wherein said crystal
(a) is in the shape of a truncated right circular cone with its bases perpendicular to said optic axis, and
(b) has two identical conical holes coaxial with said optic axis to form said reflecting surfaces.

5. A rotary light scanner as defined in claim 4
(a) wherein said crystal is a laser crystal which will lase when properly activated to produce monochromatic collimated light traveling along said optic axis, and
(b) further comprising a partially transmissive mirror on the side of the analyzer remote from said laser crystal so that said internal reflecting surfaces of said crystal and said mirror define a laser cavity, whereby said crystal lases around the periphery thereof at points corresponding to the angles through which the polarization directions are rotated by said rotator means.

6. A rotary light scanner comprising
(a) A source of light including a cylindrical birefringent crystal for transmitting along a path parallel to the longitudinal center line of said crystal the linearly polarized ordinary rays of a light beam incident on said crystal, said crystal having an optical axis transverse to said center line,
(b) optic rotator means in said path for selectively rotating the direction of polarization of each of said rays through a plurality of angles, and
(c) a plural section analyzer means having a circular configuration for passing without loss light linearly polarized in predetermined different directions depending on the direction of polarization of said ordinary rays after rotation by said optic rotator means.

7. A rotary light scanner as defined in claim 6
(a) wherein said crystal is a laser crystal which will lase when properly activated, and
(b) further comprising laser cavity forming means including
  (1) a totally reflecting mirror at the end of the crystal remote from said rotator means, and
  (2) a partially transmissive mirror at the end of said analyzer means remote from said crystal.

8. A rotary light scanner comprising
(a) a frustro-conical lasing and reflecting element having internal reflecting surfaces reflecting light incident on said element for transmitting along a path the linearly polarized rays of a light beam produced by said element,
(b) optic rotator means disposed in said path for selectively rotating the direction of polarization of each of said rays through a plurality of angles,
(c) analyzer means in said path adjacent said optic rotator means for passing without loss only rays having a predetermined direction of polarization after rotation by said optic rotator means, and
(d) a partially transmissive mirror positioned in said path adjacent said analyzer means on the side opposite said optic roator means, said internal reflecting surfaces of said element and said partially transmissive mirror defining a laser cavity.

9. A laser comprising
(a) a frustro-conical lasing and reflecting element having a plurality of internal reflecting surfaces reflecting light incident on said element, and
(b) a partially transmissive mirror positioned in the path of the light reflected by said element, said internal reflecting surfaces of said element and said partially transmissive mirror defining a laser cavity, said element having a conical surface and two base surfaces with the larger one of said two base surfaces facing said mirror and with said conical surface forming one of said internal surfaces.

10. A laser as defined in claim 9 wherein said frustoconical element is in the shape of a truncated right circular cone with its bases perpendicular to the axis of the laser and having two identical conical holes coaxial with said axis to form internal reflecting surfaces.

References Cited
UNITED STATES PATENTS

| | | | |
|---|---|---|---|
| 3,383,621 | 5/1968 | Luck et al. | |
| 3,286,193 | 11/1966 | Koester et al. | 331—94.5 |
| 3,407,364 | 10/1968 | Turner | 331—94.5 XR |
| 3,409,819 | 11/1968 | Soffer | 331—94.5 XR |
| 2,766,659 | 10/1956 | Baerwald | 350—150 |
| 3,305,292 | 2/1967 | Miller | 350—150 |
| 3,409,843 | 11/1968 | Bowness | 331—94.5 |

OTHER REFERENCES

Hubbard, et al.: "Laser Action at the $R_2$ Wavelength," Applied Optics, December 1964, vol. 3, No. 12, pp. 1499–1500.

Burns: "On The Possibility of Using Conical Refraction Phenomena for Laser Beam Steering," Applied Optics, December 1964, vol. 3, No. 12, pp. 1505–1506.

Brunton: "Polarization of the Light Output From a Ruby Optical Maser," Applied Optics, December 1964, vol. 3, No. 12, pp. 1241–1246.

DAVID SCHONBERG, Primary Examiner

P. R. MILLER, Assistant Examiner

U.S. Cl. X.R.

331—94.5; 350—152, 157